United States Patent
Hai et al.

(10) Patent No.: US 11,900,113 B2
(45) Date of Patent: Feb. 13, 2024

(54) DATA FLOW PROCESSING METHOD AND RELATED DEVICE

(71) Applicant: HUAWEI TECHNOLOGIES CO., LTD., Guangdong (CN)

(72) Inventors: Lijuan Hai, Beijing (CN); Chen Cheng, Hangzhou (CN); Christopher Rodrigues, Santa Clara, CA (US); Peng Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/227,590

(22) Filed: Apr. 12, 2021

(65) Prior Publication Data

US 2021/0232394 A1 Jul. 29, 2021

Related U.S. Application Data

(63) Continuation of application No. PCT/CN2019/110741, filed on Oct. 12, 2019.

(30) Foreign Application Priority Data

Oct. 23, 2018 (CN) .......................... 201811236134.8

(51) Int. Cl.
```
G06F 8/41      (2018.01)
G06F 9/30      (2018.01)
G06F 9/38      (2018.01)
G06F 9/52      (2006.01)
G06F 8/30      (2018.01)
```
(52) U.S. Cl.
CPC ............ *G06F 9/3005* (2013.01); *G06F 8/314* (2013.01); *G06F 8/433* (2013.01); *G06F 8/458* (2013.01); *G06F 9/30087* (2013.01); *G06F 9/3867* (2013.01); *G06F 9/522* (2013.01)

(58) Field of Classification Search
CPC ....................................................... G06F 8/458
USPC ....................................................... 717/140
See application file for complete search history.

(56) References Cited

U.S. PATENT DOCUMENTS 10,445,097 B2 * 10/2019 Burger ...................... G06F 9/32
11,126,574 B1 *  9/2021 Prabhakar ........... G06F 15/7871
11,157,213 B2 * 10/2021 Golov ...................... G06N 3/06
(Continued)

FOREIGN PATENT DOCUMENTS

CN          102089752 A      6/2011
CN          102799414 A     11/2012
(Continued)

OTHER PUBLICATIONS

NPL-KR20160108754A Text English Translation.*
(Continued)

*Primary Examiner* — Francisco J Aponte
(74) *Attorney, Agent, or Firm* — Fish & Richardson P.C.

(57) ABSTRACT

The present disclosure relates to data flow processing methods and devices. One example method includes obtaining a dependency relationship and an execution sequence of operating a data flow by a plurality of processing units, generating synchronization logic based on the dependency relationship and the execution sequence, and inserting the synchronization logic into an operation pipeline of each of the plurality of processing unit to generate executable code.

19 Claims, 10 Drawing Sheets

(56) References Cited

U.S. PATENT DOCUMENTS

| | | | |
|---|---|---|---|
| 11,237,880 B1* | 2/2022 | Raumann | G06F 9/5027 |
| 2009/0300337 A1* | 12/2009 | Wang | G06F 9/3897 |
| | | | 712/225 |
| 2010/0293535 A1 | 11/2010 | Andrade et al. | |
| 2013/0219370 A1 | 8/2013 | Beale et al. | |
| 2015/0074374 A1 | 3/2015 | Zhang et al. | |
| 2016/0070550 A1* | 3/2016 | Van Eijndhoven | G06F 8/433 |
| | | | 717/156 |
| 2016/0364828 A1 | 12/2016 | Valerio et al. | |
| 2017/0083327 A1* | 3/2017 | Burger | G06F 9/3004 |
| 2017/0083334 A1* | 3/2017 | Burger | G06F 9/30072 |
| 2018/0181403 A1* | 6/2018 | Vorbach | G06F 9/30123 |
| 2019/0138373 A1* | 5/2019 | Nicol | G06N 3/105 |
| 2019/0235780 A1* | 8/2019 | DeBenedictis | G06F 3/0604 |
| 2019/0377580 A1* | 12/2019 | Vorbach | G06F 9/30123 |
| 2019/0391796 A1* | 12/2019 | Brady | G06F 8/456 |
| 2020/0004514 A1* | 1/2020 | Yu | G06F 9/30123 |
| 2020/0117449 A1* | 4/2020 | Golov | G06F 12/0802 |
| 2021/0048991 A1* | 2/2021 | Tanner | G06F 8/4434 |
| 2021/0373867 A1* | 12/2021 | Chen | G06F 15/825 |
| 2022/0058034 A1* | 2/2022 | Grohoski | G06F 9/44 |
| 2022/0156071 A1* | 5/2022 | Norrie | G06N 3/045 |

FOREIGN PATENT DOCUMENTS

| | | | | |
|---|---|---|---|---|
| CN | 103377035 A | 10/2013 | | |
| CN | 103699365 A | 4/2014 | | |
| CN | 103970580 A | 8/2014 | | |
| CN | 105408860 A | 3/2016 | | |
| CN | 107077717 A | 8/2017 | | |
| CN | 108319458 A | 7/2018 | | |
| CN | 111008042 A * | 4/2020 | | G06F 9/30145 |
| KR | 20160108754 A * | 6/2015 | | |

OTHER PUBLICATIONS

Chen et al., "TVM: End-to-End Optimization Stack for Deep Learning," University of Washington Technical Report UW-CSE, Dec. 1, 2017, 19 pages.

Jouppi et al., "In-Datacenter Performance Analysis of a Tensor Processing Unit," Proceedings of the 44th annual International Symposium on Computer Architecture, Jun. 2017, 12 pages.

PCT International Search Report and Written Opinion issued in International Application No. PCT/CN2019/110741 dated Jan. 10, 2020, 16 pages (with English translation).

Smith, "Decoupled Access/Execute Computer Architectures," ACM Transactions on Computer Systems, vol. 2, No. 4, Nov. 1984, 20 pages.

Office Action in Chinese Appln. No. 201811236134.8, dated Feb. 13, 2023, 14 pages.

Tang et al., "Research on stream program task scheduling and cache optimization for X86 multi-core processor," Journal of University of Science and Technology of China, vol. 46, No. 3, Mar. 2016, 8 pages (with English Abstract).

\* cited by examiner

```
Step 0:
for vthread tx in 0..1:
  out_buffer CL[8]
  input_buffer AL[8]
  for each k in 0..128:
    q0.dma_copy2d(AL, A[k][tx*8:tx*8+8])
    q1.accumulate(AL, CL)
```

```
Step 1:
for vthread tx in 0..1:
  out_buffer CL[8]
  input_buffer AL[8]
  q1.push_dep_to(q0)

for each k in 0..128:
    q0.pop_dep_from(q1)
    q0.dma_copy2d(AL, A[k][tx*8:tx*8+8])
    q0.push_dep_to(q1)

q1.pop_dep_from(q0)
    q1.accumulate(AL, CL)
    q1.push_dep_to(q0)
```

```
Step 2:
out_buffer CL[2][8]
input_buffer AL[2][8]
for tx in 0..1:
  q1.push_dep_to(q0)

for each k in 0..128:
  for tx in 0..1:
    q0.pop_dep_from(q1)
    q0.dma_copy2d(AL, A[k][tx*8:tx*8+8])
    q0.push_dep_to(q1)

for tx in 0..1:
    q1.pop_dep_from(q0)
    q1.accumulate(AL, CL)
    q1.push_dep_to(q0)
```

FIG. 3

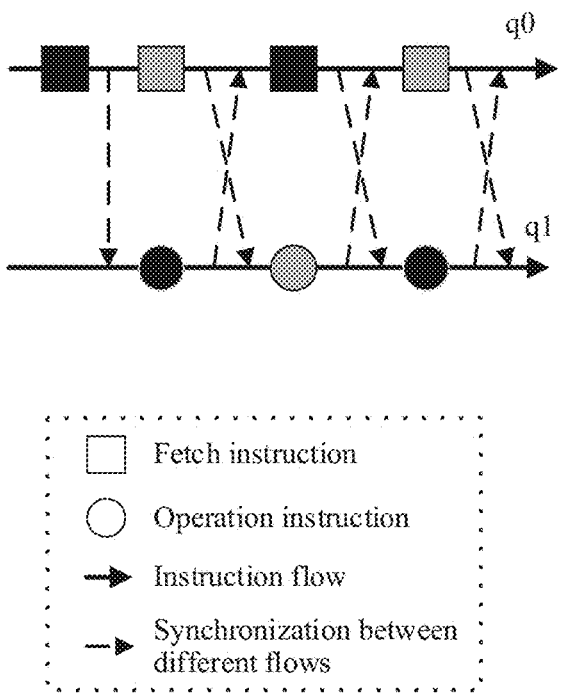

```
input_buffer AL[2][8]
out_buffer CL[2][8]

q1.push_dep_to(q0)
q1.push_dep_to(q0)

for each ko in 0..128:
  ◇ q0.pop_dep_from(q1)
  ■ q0.dma_copy2d(AL[0], A[k][0:8])
  ◇ q0.push_dep_to(q1)
  ◇ q0.pop_dep_from(q1)
  ■ q0.dma_copy2d(AL[1], A[k][8:16])
  ◇ q0.push_dep_to(q1)

◇ q1.pop_dep_from(q0)
  ● q1.accumulate(AL[0], CL[0])
  ◇ q1.push_dep_to(q0)
  ◇ q1.pop_dep_from(q0)
  ◉ q1.accumulate(AL[1], CL[1])
  q1.push_dep_to(q0)
...
```

FIG. 4

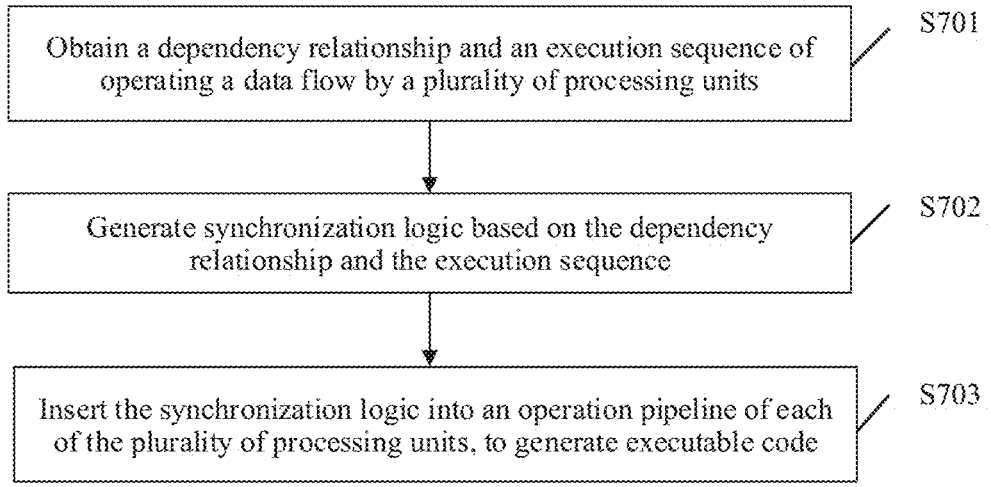
FIG. 7
```
__ca__Buffer<half,2> r1 = make_buffer({0x0, 0x100});
__cb__Buffer<half,2> r2 = make_buffer({0x0, 0x100});
Pipeline {
        for(j=0; j<2; j++){
        r1 <- Stage two {
                producer2(r1.rawPtr());
        }
        r2 <- Stage three {
                producer2(r2.rawPtr());
        }
        Stage four depend_on(r1,r2) {
                consumer(r1.rawPtr(),r2.rawPtr());
        }
        }
};
```
FIG. 8
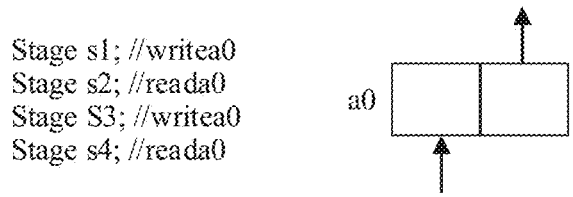
FIG. 9

```
                           Operation              Earlier
                           determining            operation
1 for (i=0;i<10;i++){      (2,{i=1})  (3,{i=0})   (3,{i=0})
2 A();                     (2,{i=1})  (3,{i=1})   (2,{i=1})
3 B();                     (2,{i=x})  (3,{i=y})   if(x>y)
}
```
FIG. 10
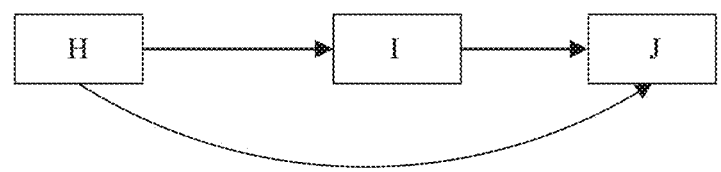
FIG. 11(A)
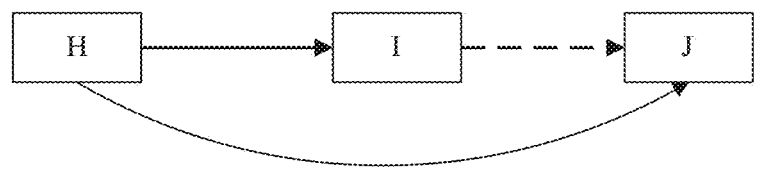
FIG. 11(B)
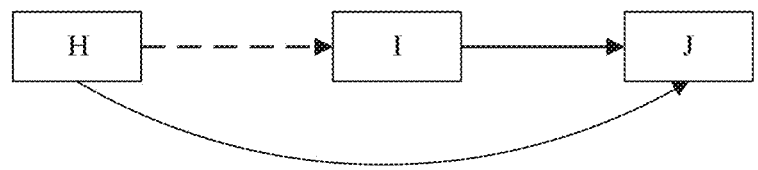
FIG. 11(C)

```
for(unint64_t i=0; i < flowTable->loopNum; i++){
    get regXm(flowTable, i, ®Xm, ®Xt, &loadSize);
    if(i >= 2){
        wiat_flag(PIPE_V,PIPE_MTE2, (event_t)(i%2));
    }
    outToUb(flowTable,i,regXm);
    if(i >= 2){
        wait_flag( PIPE_MTE3,PIPE_V, (event_t)(i%2));
    }
    set_flag(PIPE_MTE2,PIPE_V, (event_t)(i%2));
    wait_flag(PIPE_MTE2,PIPE_V, (event_t)(i%2));
    vector_rule(flowTable,i,regXt);
    if(flowTable->loopNum>2 && 1 < flowTable->loopNUm-2){
        set_flag(PIPE_V,PIPE_MTE2,(event_t)(i%2));
    }
    set_flag(PIPE_V,PIPE_V, (event_t)(i%2));
    wait_flag(PIPE_V,PIPE_V, (event_t)(i%2));
    ubToOut(flowTable,i,regXm);
    if(flowTable->loopNum>2 && 1 < flowTable->loopNum-2){
        set_flag(PIPE_MTE3,PIPE_V, (event_t)(i%2));
    }
}
set_flag(PIPE_MTE3,PIPE_S, (event_t)0;
wait_flag(PIPE_MTE3,PIPE_S, (event_t)0;
return;
```

First operation → outToUb(flowTable,i,regXm);

Second operation → vector_rule(flowTable,i,regXt);

Third operation → ubToOut(flowTable,i,regXm);

FIG. 13

```
__ubuf__ Buffer<half, 1> ubInputBuf = make_buffer({(half*)flowTable->ubInputAddr[0]});
__ubuf__ Buffer<half, 1> ubOutputBuf = make_buffer({(half*)flowTable->ubOutputAddr[0]});

Pipeline {
        for(int i=0; i < flowTable->loopNum; i++){
                ubInputBuf <- Stage outToUb {
                        get_regXm(flowTable, i ®Xm. ®Xt, &loadSize);
                        outToUb(flowTable,i,regXm,ubInputBuf,rawPtr());
                }
                ubOutputBuf <- Stage vector_rule depend_on(ubInputBuf) {
                        vector_rule(flowTable, i, regXt,
ubInputBuf.rawPtr(),ubOutputBuf.rawPtr());
                }
                Stage ubToOut depend_on(ubOutputBuf){
                        ubToOut(flowTable, i, regXm, ubOutputBuf.rwaPtr());
                }
        }
}
```

FIG. 14

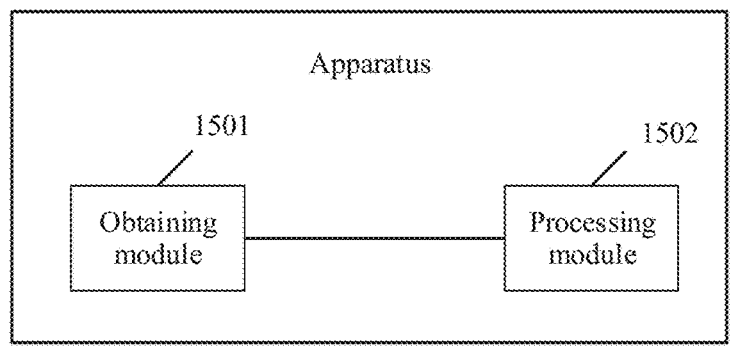

FIG. 15

DATA FLOW PROCESSING METHOD AND RELATED DEVICE

CROSS-REFERENCE TO RELATED APPLICATIONS

This application is a continuation of International Application No. PCT/CN2019/110741, filed on Oct. 12, 2019, which claims priority to Chinese Patent Application No. 201811236134.8, filed on Oct. 23, 2018. The disclosures of the aforementioned applications are hereby incorporated by reference in their entireties.

TECHNICAL FIELD

This application relates to the data processing field, and in particular, to a data flow processing method and a related device.

BACKGROUND

With rapid development of machine learning and deep learning technologies, computing capabilities of computers in a traditional architecture cannot meet a current service requirement. Therefore, dedicated hardware accelerators, for example, a tensor processing unit (TPU) developed by Google and the world's first commercial deep learning processor launched by Cambricon, that are customized in depth for services in the artificial intelligence (AI) field are successively launched. An acceleration effect oriented to machine learning and deep learning models is faster than those of a traditional central processing unit (CPU) and a traditional graphics processing unit (GPU) by more than one order of magnitude.

To improve a parallel throughput capability, an AI hardware accelerator usually uses a design principle of decoupling data access from computing. A plurality of parallel operation pipelines are provided internally to process data in an asynchronous and parallel manner. For example, some operation pipelines specially perform a direct memory access (DMA) operation to access data, some operation pipelines specially perform a matrix multiplication operation, and some operation pipelines specially perform a vector operation. After a data access instruction is sent, immediate asynchronous returning is performed, and a subsequent operation (for example, a matrix multiplication operation or a vector operation) can be performed without waiting for accessed data to be ready. For a plurality of operations such as A read B write, A write B write, or A write B read that occur at a same address, if there is no time sequence dependency between the plurality of operations, execution concurrency can be improved in the asynchronous and parallel manner if there is a time sequence dependency between the plurality of operations, in the asynchronous and parallel manner, an operation may be performed without waiting for data access to be ready. As a result, an incorrect calculation result is generated.

To resolve the foregoing problem, a TPU provides a pipeline synchronization instruction to manage an asynchronous and parallel operation pipeline. A tensor virtual machine (TVM) provides a more convenient manner of automatically inserting a synchronization instruction to implement time sequence consistency. However, there are still problems of low compilation performance and low data processing efficiency.

SUMMARY

Embodiments of this application provide a data flow processing method and a related device, to improve compilation performance and data processing efficiency.

According to a first aspect, an embodiment of this application provides a data flow processing method, including: first obtaining a dependency relationship and an execution sequence of operating a data flow by a plurality of processing units, and then generating synchronization logic based on the dependency relationship and the execution sequence; and finally, inserting the synchronization logic into an operation pipeline of each of the plurality of processing units, to generate executable code.

The dependency relationship and the execution sequence between operations are determined through serialization analysis, and a compiler automatically inserts the synchronization logic. This simplifies programming code, thereby improving compilation performance and data processing efficiency.

In a possible design, descriptive code used to describe the data flow is obtained, and the dependency relationship and the execution sequence are determined based on the descriptive code. A user defines a buffer and an operation pipeline and specifies a read buffer and a write buffer of the operation pipeline to describe the data flow. A synchronization manner based on a data flow description hides hardware synchronization details, simplifies programming code, and decouples a hardware architecture and software development to facilitate separate upgrades of software and hardware.

In another possible design, the descriptive code includes at least one of a keyword used to define a buffer variable, a keyword used to describe a read operation and a write operation for buffering the data flow, an operator used to specify a write buffer variable, and a keyword used to specify a read buffer variable. The descriptive code is a language for describing synchronization between a plurality of pipelines based on a data flow.

In another possible design, the dependency relationship indicates that because operation instructions in the plurality of operation pipelines access, that is, read and write, a same storage address, an operation instruction in one operation pipeline needs to be executed first before an operation instruction in another operation pipeline can start to be executed. The execution sequence indicates a time sequence in which operation instructions of the plurality of processing units that are transmitted to a corresponding type of operation pipeline wait for execution.

In another possible design, a dependency decision tree of operating the data flow by the plurality of processing units may be constructed based on the dependency relationship and the execution sequence, and the synchronization logic is generated based on the dependency decision tree. The dependency decision tree is constructed to simplify representation of the dependency relationship between the operations.

In another possible design, the synchronization logic includes a barrier instruction and an event synchronization instruction, where the event synchronization instruction is generated based on the dependency relationship, and the barrier instruction is generated based on the execution sequence. The barrier instruction and the event synchronization instruction are generated, so that the barrier instruction and the event synchronization instruction are inserted into the operation pipeline, to ensure data processing correctness.

In another possible design, the barrier instruction is used to ensure that all operation instructions before the barrier instruction are executed first before a subsequent operation instruction can start to be executed. When a single operation pipeline is blocked, all operation instructions in the operation pipeline before the barrier instruction are executed first before a subsequent operation instruction can start to be executed. When all operation pipelines are blocked, operation instructions in all the operation pipelines before the barrier instruction are executed first before a subsequent operation instruction can start to be executed. The event synchronization instruction is used to ensure synchronization between operation instructions in different operation pipelines.

In another possible design, it may be determined whether the dependency relationship is transfer dependency. When the dependency relationship is not transfer dependency, the synchronization logic is generated, to eliminate transfer dependency between operations, ensure insertion of an optimal synchronization instruction, maximize synchronization resource utilization, and reduce synchronization overheads.

In another possible design, a buffer includes a first area and a second area, and a data flow may be written into the first area. After all data flows are written into the first area, the first area and the second area are switched to each other, a new data flow is written into the second area, and the originally written data flow is read from the first area. In this way, data processing performance is improved by using a double buffering technology.

In another possible design, a prefetch request is sent before the buffer may fail, so that a data flow is already written into the buffer in advance when the data flow is read, thereby avoiding a processor pause caused by a failure of the buffer. Efficient executable code is generated through prefetch optimization.

According to a second aspect, an embodiment of this application provides a data flow processing apparatus. The data flow processing apparatus is configured to implement the method and the functions performed by the compiler in the first aspect, and is implemented by using hardware/software. The hardware/software thereof includes units corresponding to the foregoing functions.

According to a third aspect, an embodiment of this application provides a data flow processing device, including: a processor, a memory, and a communications bus, where the communications bus is configured to implement connection and communication between the processor and the memory, and the processor executes a program stored in the memory, to perform the steps in the data flow processing method according to the first aspect.

In a possible design, the data flow processing device provided in this embodiment of this application may include a corresponding module configured to perform an action of the data flow processing apparatus in the foregoing method design. The module may be software and/or hardware.

According to a fourth aspect, an embodiment of this application provides a computer-readable storage medium, where the computer-readable storage medium stores an instruction, and when the instruction runs on a computer, the computer is enabled to perform the methods according to the foregoing aspects.

According to a fifth aspect, an embodiment of this application provides a computer program product including an instruction, where when the computer program product runs on a computer, the computer is enabled to perform the methods according to the foregoing aspects.

BRIEF DESCRIPTION OF DRAWINGS

To describe the technical solutions in the embodiments of this application or in the background more clearly, the following briefly describes the accompanying drawings for describing the embodiments of this application or the background.

FIG. 3 is a schematic diagram of converting a virtual thread parallel program into an explicit synchronous program according to an embodiment of this application;

FIG. 4 is a schematic diagram of an effect of interleaving scheduling optimization by a compiler according to an embodiment of this application;

FIG. 7 is a schematic flowchart of a data flow processing method according to an embodiment of this application;

FIG. 8 shows descriptive code based on a data flow description according to an embodiment of this application;

FIG. 9 is a schematic diagram of a dependency relationship according to an embodiment of this application;

FIG. 10 is a schematic diagram of an execution sequence according to an embodiment of this application;

FIG. 11(A) is a schematic diagram of transfer dependency according to an embodiment of this application;

FIG. 11(B) is a schematic diagram of another transfer dependency according to an embodiment of this application;

FIG. 11(C) is a schematic diagram of still another transfer dependency according to an embodiment of this application;

FIG. 13 shows programming code for explicitly invoking a synchronization instruction according to an embodiment of this application;

FIG. 14 shows programming code based on a data flow description according to an embodiment of this application;

FIG. 15 is a schematic structural diagram of a data flow processing apparatus according to an embodiment of this application.

DESCRIPTION OF EMBODIMENTS

The following describes the embodiments of this application with reference to the accompanying drawings in the embodiments of this application.

Figure 1:
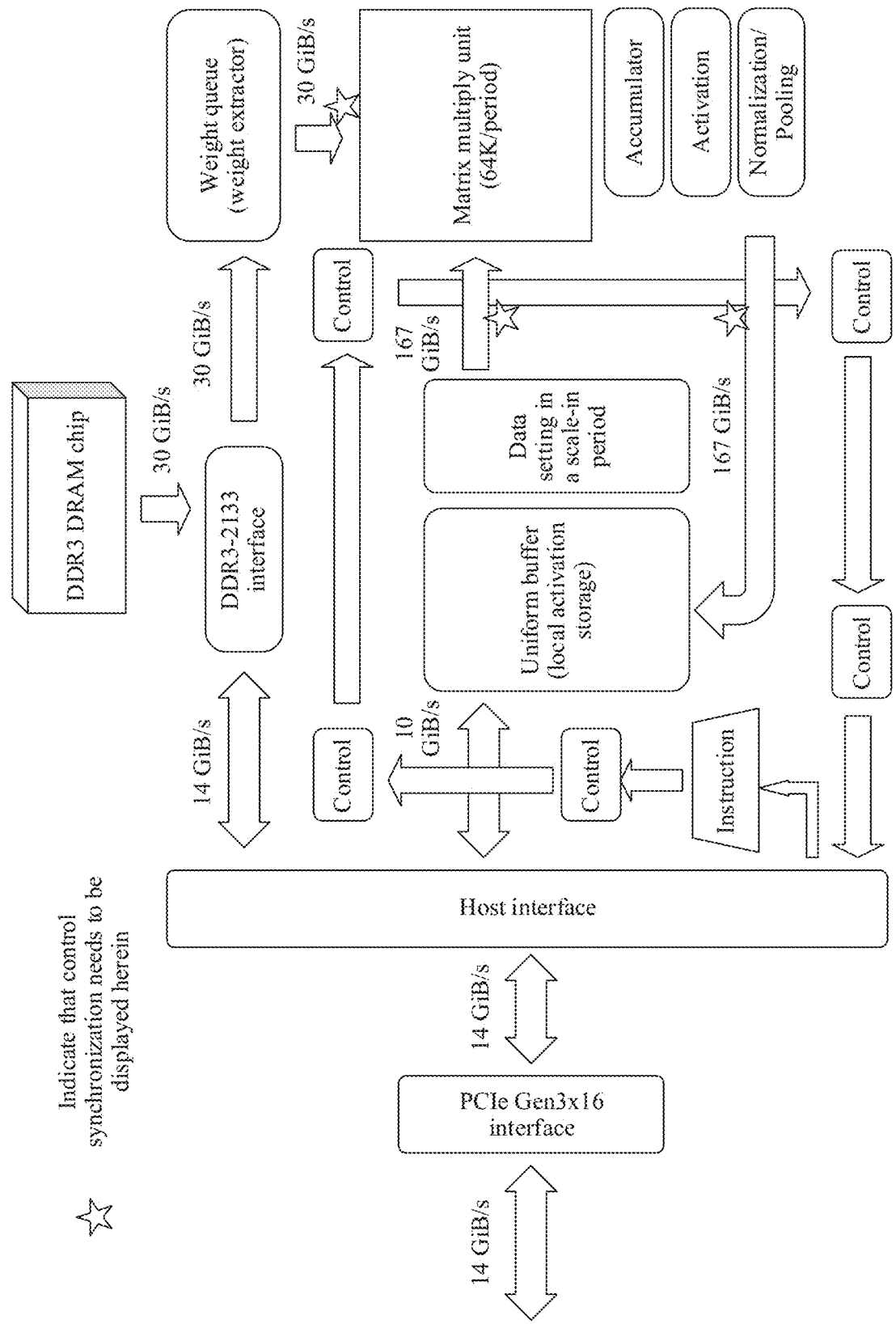
FIG. 1 is a schematic structural diagram of a TPU according to an embodiment of this application.

FIG. 1 is a schematic structural diagram of a TPU according to an embodiment of this application. TPU hardware provides a synchronization instruction between operation pipelines, and the synchronization instruction may be explicitly invoked by software, to ensure execution of an instruction time sequence. The TPU internally has four different types of processing units, and each processing unit corresponds to an operation pipeline. The TPU not only includes a core acceleration unit such as a matrix multiply unit, but also includes a plurality of data buffers. A data flow in a unified buffer (UB) and a weight queue (weight FIFO) is input into the matrix multiply unit, and then is output to an activation by the matrix multiply unit to execute an activation function. Explicit control synchronization occurs between matrix multiplication and data access, and a corresponding synchronization instruction is provided. The synchronization instruction may be invoked through programming control.

Figure 2:
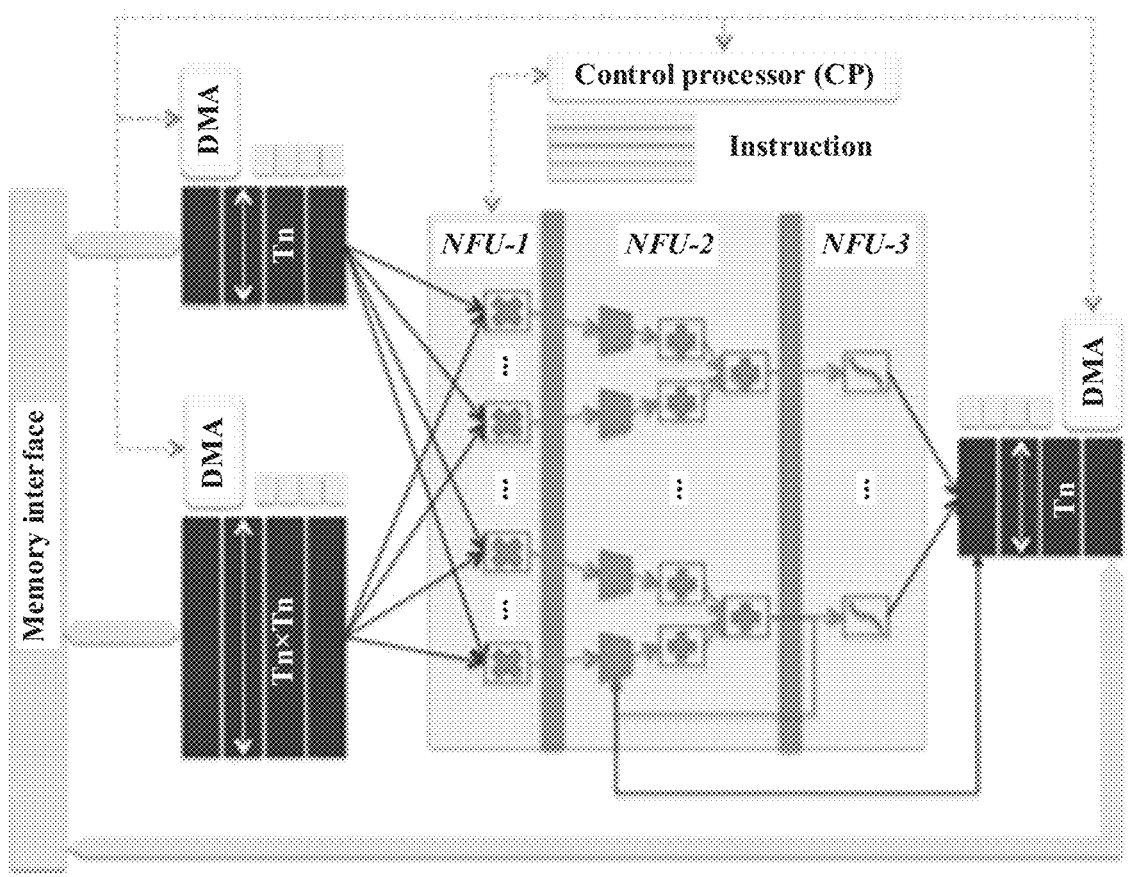
FIG. 2 is an architectural diagram of a processor according to an embodiment of this application.

FIG. 2 is an architectural diagram of a processor according to an embodiment of this application. The processor internally includes six different types of processing units, where each processing unit corresponds to one operation pipeline, and all pipelines include three DMA pipelines and three neural functional units (NFU). The three NFUs are separately configured to be responsible for operations such as multiplication, accumulation, and activation. The processor provides a synchronization instruction between operation pipelines, and the synchronization instruction may be invoked through programming control.

In conclusion, the foregoing two manners simplify hardware design, but have highly difficult programming. In addition, a synchronization instruction is directly exposed to an upper-layer developer, causing severe coupling between a program and hardware and hindering a hardware upgrade or code migration. To resolve the foregoing problem, a TVM may be used to perform synchronous analysis and parallel optimization. A virtual thread binding mechanism is introduced in the TVM to describe a relationship between a service operation and an underlying execution unit, thereby ensuring highly-concurrent synchronous control. A user needs to explicitly specify a virtual thread ID corresponding to a task. Each tensor operation in the task is mapped to each operation pipeline ID according to a certain rule. In terms of semantics, serial execution is performed within a virtual thread, and parallel execution is performed between virtual threads. The TVM analyzes a time sequence relationship between operations, inserts a synchronization instruction into a virtual thread to ensure serial execution, and interleaves scheduling optimization between virtual threads.

FIG. 3 is a schematic diagram of converting a virtual thread parallel program into an explicit synchronous programming model according to an embodiment of this application. FIG. 3 includes: Step 0. A program with a relatively high abstraction level describes a virtual thread by using an annotation. Step 1: Add a synchronization instruction, where push_dep_to is a production interface of a synchronization message, and pop_dep_from is a consumption interface of a synchronization message. Step 2: Map a plurality of virtual threads to one (physical entity) thread, to interleave scheduling optimization. FIG. 4 is a schematic diagram of an effect of interleaving scheduling optimization by a compiler according to an embodiment of this application. Operations of the two virtual threads (a virtual thread 0 and a virtual thread 1) on which a compiler has interleaved scheduling optimization may be performed in parallel. However, serial execution within the virtual thread suppresses parallel execution of a plurality of operation pipelines of a hardware accelerator, and affects compilation performance and data processing efficiency of the compiler.

Figure 5:
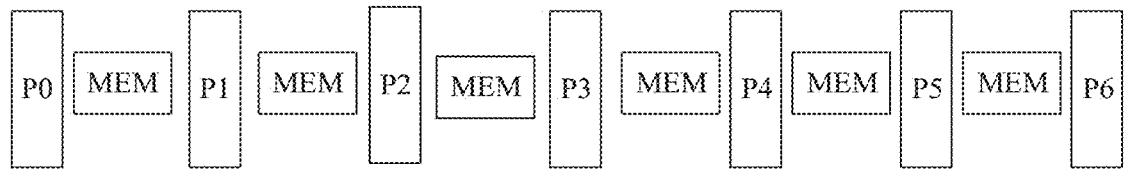
FIG. 5 is a schematic architectural diagram of an application system according to an embodiment of this application.
Figure 6:
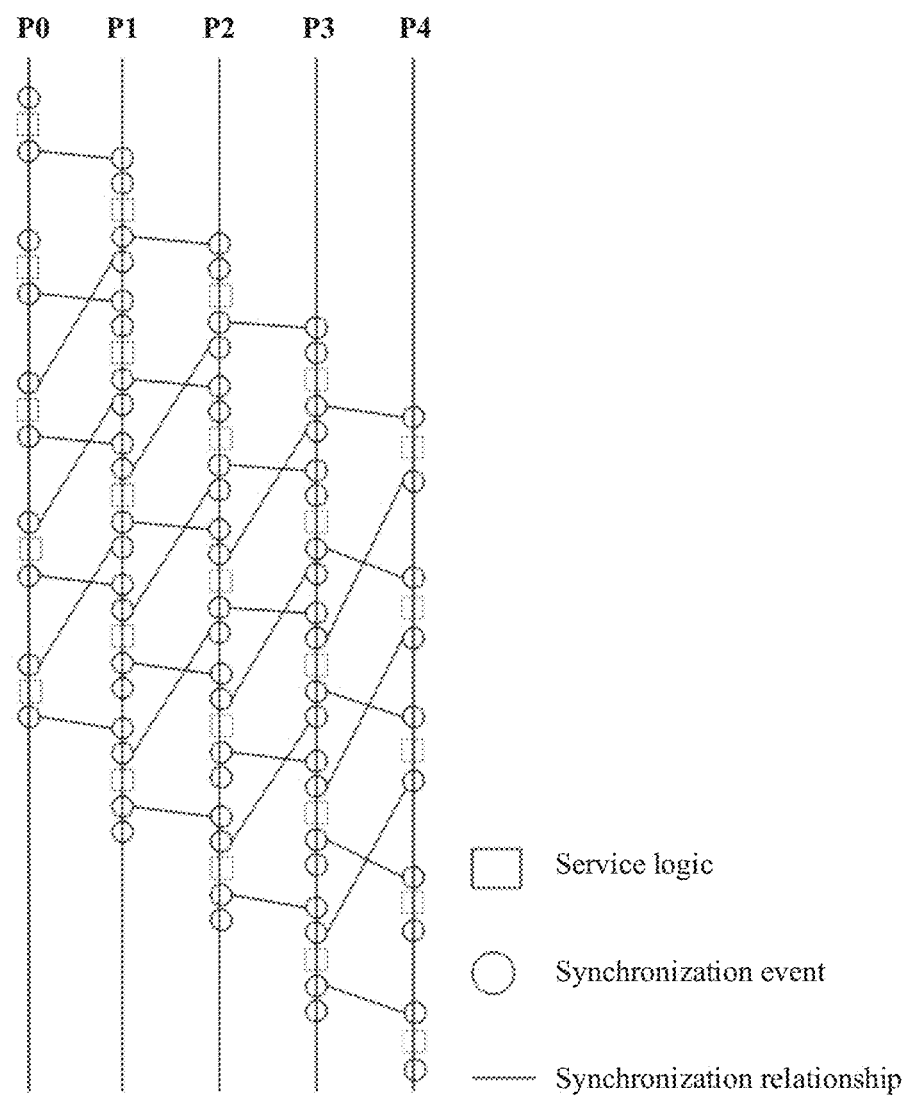
FIG. 6 is a schematic diagram of synchronization of a plurality of operation pipelines according to an embodiment of this application.

FIG. 5 is a schematic architectural diagram of an application system according to an embodiment of this application. The application system includes a plurality of memory units (MEM) and a plurality of operation pipelines (P0, P1, P2, P3, and P4). A hardware accelerator is generally designed based on a principle of decoupling data access from computing, and internally provides a plurality of parallel operation pipelines to execute specific types of operations. After an operation instruction is sent, immediate returning is performed without waiting for actual completion of an operation, thereby improving execution concurrency of the plurality of operation pipelines. However, time sequence consistency between the plurality of operation pipelines needs to be ensured. When instructions of operation pipelines are concurrently executed, if there is data dependency between the operation pipelines, a synchronization instruction needs to be invoked to synchronize an execution sequence between the operation pipelines. FIG. 6 is a schematic diagram of synchronization of a plurality of operation pipelines according to an embodiment of this application. An operation pipeline is used as an example. A synchronization operation process includes: firstly, waiting for completion of a write operation performed by a predecessor execution unit, secondly, waiting for completion of a read operation performed by a successor execution unit, thirdly, executing an instruction, fourthly, instructing the successor execution unit to read data, and fifthly, instructing the predecessor execution unit to write data. In conclusion, a synchronization instruction needs to be inserted before and after execution of an operation of each operation pipeline, to ensure a data dependency sequence between the operation of each operation pipeline and the predecessor execution unit and between the operation of each operation pipeline and the successor execution unit. Based on the foregoing design principle, an embodiment of this application provides the following technical solution.

FIG. 7 is a schematic flowchart of a data flow processing method according to an embodiment of this application. This embodiment of this application includes the following steps.

S701: Obtain a dependency relationship and an execution sequence of operating a data flow by a plurality of processing units.

During specific implementation, a compiler may obtain descriptive code used to describe the data flow, and determine the dependency relationship and the execution sequence based on the descriptive code. The descriptive code includes at least one of a keyword used to define a buffer variable, a keyword used to describe a read operation and a write operation for buffering the data flow, an operator used to specify a write buffer variable, and a keyword used to specify a read buffer variable, A user defines a buffer and an operation pipeline and specifies a read buffer and a write buffer of the operation pipeline to describe the data flow A synchronization manner based on a data flow description hides hardware synchronization details, simplifies programming, and decouples a hardware architecture and software development to facilitate software and hardware upgrade.

Certainly, in this embodiment of this application, the dependency relationship and the execution sequence of operating the data flow by the plurality of processing units may alternatively be obtained in another manner.

For example, a language for describing synchronization between a plurality of pipelines based on a data flow is designed, and seven keywords such as make_buffer, Buffer, rawPtr, Pipeline, Stage, depend_pn, and clear, and operators "←" and "<←+" are extended. make_buffer and Buffer are used to define a buffer variable. rawPtr is used to obtain an address of a buffer variable. Stage is used to describe a read operation and a write operation for buffering a data flow depend_on( ) is used to indicate that a buffer variable in brackets is a read buffer variable of a current operation. Pipeline is used to describe a data flow to be synchronized. clear is used to switch to a next area of double buffers. "←" and "←+" are used to specify that a buffer variable before the operator is a write buffer variable of a current operation, where after "←" is executed, the double buffers are automatically switched.

FIG. 8 shows descriptive code based on a data flow description according to an embodiment of this application. A first row of code is used to define an address of a buffer variable r1. A second row of code is used to define an address of a buffer variable r2. A third row of code is used to describe a function range of a data flow A fifth row of code is used to describe writing, at a stage two of an operation pipeline, data into the address indicated by r1. A sixth row of code is used to obtain the specific address indicated by r1. An eighth row of code is used to describe writing, at a stage three of the operation pipeline, data into an address indicated by r2. A ninth row of code is used to obtain a specific address indicated by r2. An eleventh row of code is used to describe reading, at a stage four, data from the addresses indicated by r1 and r2. A twelfth row of code is used to obtain the specific addresses indicated by r1 and r2. Buffer variables r1 and r2 before "←" and buffer variables r1 and r2 of depend_on form a production and consumption relationship between operation pipelines. An operation at the stage four depends on an operation at the stage two and an operation at the stage three.

The dependency relationship indicates that because operation instructions in the plurality of operation pipelines access, that is, read and write, a same storage address, an operation instruction in one operation pipeline is executed first before an operation instruction in another operation pipeline can start to be executed. The execution sequence (which may also be referred to as an instruction transmission sequence) indicates a time sequence in which operation instructions of the plurality of processing units that are transmitted to a corresponding type of operation pipeline wait for execution. An algorithm mainly considers a time sequence, that is, a software execution sequence in which operation instructions are transmitted to a corresponding operation pipeline. However, an actual time sequence of hardware execution may be different from the execution sequence.

For example, as shown in FIG. 8, operations in three operation pipelines are respectively produce1, produce2, and consumer. The produce1 performs write access to storage space r1, the produce2 performs write access to storage space r2, and the consumer performs read access to the storage space r1 and the storage space r2. In this way, there is a corresponding dependency relationship of first writing and then reading. Therefore, produce1 and produce2 operations are completed first before a consumer operation can start to be performed. In other words, there is a dependency relationship between the consumer operation and the produce1 and between the consumer operation and the produce2. In FIG. 8, the execution sequence is a time sequence in which operation instructions transmitted to a corresponding operation pipeline wait for execution. In consideration of existence of a loop in code, the execution sequence should be: produce1 (first iteration)→produce2 (first iteration)→consumer (first iteration)→produce1 (second iteration)→produce2 (second iteration)→consumer (second iteration).

Further, as shown in FIG. 9, for an access operation of Butler a0, four operation pipelines Stage 1, Stage 2, Stage 3, and Stage 4 are provided. If Stage 1, Stage 2, Stage 3, and Stage 4 are executed sequentially, where a0 is double buffer addresses, Stage 1 and Stage 3 are write operations, and Stage 2 and Stage 4 are read operations, stage 1 and stage 2 write a ping address of a0 and read the ping address of a0 respectively, and Stage 3 and Stage 4 write a pong address of a0 and read the pong address of a0 respectively. Therefore, there is a dependency relationship between Stage 1 and Stage 2, and there is a dependency relationship between Stage 3 and Stage 4.

Further, as shown in FIG. 10, statements of an operation A and an operation B are in a for loop, and the loop is iterated for 10 times. A compiler may determine an execution sequence of any two operations based on a position of each operation in the for loop and a quantity of iterations of the loop in which each operation is located, A quantity of code rows indicates a position of a single operation in the for loop, and a loop variable indicates a quantity of iteration executions. When two operations are in different loop iterations, an instance with a smaller loop iteration variable occurs earlier. For example, $(3, \{i=0\})$ indicates the operation B in a first loop iteration, and $(2, \{i=1\})$ indicates the operation A in a second loop iteration. Because the loop iteration variable of the operation B is smaller than that of the operation A, the operation B is performed before the operation A. When two operation instances are in a same loop iteration, an operation instance with a front code location occurs earlier. For example, $(2, i=1\})$ indicates the operation A in the second loop iteration, and $(3, \{i=1\})$ indicates the operation B in the second loop iteration. Because the code location of the operation A is before that of the operation B, the operation A is performed before the operation B. When quantities of loop iterations of two operation instances are indeterminate, an earlier operation may be determined based on values of loop iteration variables x and y.

S702, Generate synchronization logic based on the dependency relationship and the execution sequence. The synchronization logic may also be referred to as a synchronization instruction.

During specific implementation, the dependency relationship indicates that a first operation instruction in an operation pipeline of a first processing unit of the plurality of processing units is executed first before a second operation instruction in an operation pipeline of a second processing unit of the plurality of processing units starts to be executed. The execution sequence indicates a time sequence in which operation instructions of the plurality of processing units that are transmitted to a corresponding type of operation pipeline wait for execution. The synchronization logic includes a barrier instruction and an event synchronization instruction, and the barrier instruction may be generated based on the execution sequence. The barrier instruction is used to ensure that all operation instructions before the barrier instruction are executed first before a subsequent operation instruction can start to be executed. When a single operation pipeline is blocked, all operation instructions in the operation pipeline before the barrier instruction are executed first before a subsequent operation instruction can start to be executed. When all operation pipelines are blocked, operation instructions in all the operation pipelines before the barrier instruction are executed first before a subsequent operation instruction can start to be executed. The event synchronization instruction may be generated based on the dependency relationship. The event synchronization instruction is used to ensure synchronization between operation instructions in different operation pipelines. For example, all operation instructions before an operation instruction in an operation pipeline M are executed first before an operation instruction after an operation instruction in an operation pipeline V can start to be executed.

Optionally, not all dependency relationships between operations require generation of a synchronization instruction. It may be determined whether the dependency relationship is transfer dependency, where the transfer dependency represents a mutual dependency relationship generated in relationship transfer of a plurality of operations. When the dependency relationship is the transfer dependency, the synchronization logic is not generated, and when the dependency relationship is not the transfer dependency, the synchronization logic is generated, to eliminate transfer dependency between operations, ensure insertion of an optimal synchronization instruction, maximize synchronization resource utilization, and reduce synchronization overheads.

For example, as shown in FIG. 11(A), there are three operations H, I, and J. There is a dependency relationship between J and H and between J and I, and there is a dependency relationship between I and H. In this case, there is transfer dependency between H and J. Because J and I are synchronized, I and H are synchronized, and J and H are already synchronized while J and I are synchronized, no synchronization instruction needs to be generated for J and H. Further, as shown in FIG. 11(B), for three operations H, I, and J, there is a dependency relationship between H and I, and I and J are operations of a same pipeline. In this case, there is transfer dependency between H and J. Because operations of a same pipeline start to be executed sequentially, and H and J are implicitly synchronized while H and I are synchronized, no synchronization instruction needs to be generated for J and H. Further, as shown in FIG. 11(C), for three operations H, I, and J, there is a dependency relationship between I and J, and H and I are operations of a same pipeline. In this case, there is transfer dependency between H and I Because operations of a same pipeline start to be executed sequentially, and J and H are implicitly synchronized while J and I are synchronized, no synchronization instruction needs to be generated for J and H.

Further, a dependency decision tree of operating the data flow by the plurality of processing units may be constructed based on the dependency relationship and the execution sequence; and the synchronization logic is generated based on the dependency decision tree, thereby simplifying representation of the dependency relationship between the operations by constructing the dependency decision tree. The dependency decision tree is a tree-like structure, where each node in the tree-like structure represents an operation, an inter-layer relationship in the tree-like structure represents the execution sequence, and a connection relationship in the tree-like structure may indicate that there is a dependency relationship between two operations.

S703: Insert the synchronization logic into an operation pipeline of each of the plurality of processing units, to generate executable code.

Optionally, a buffer may include a first area and a second area, and a data flow may be written into the first area. After all data flows are written into the first area, the first area and the second area are switched to each other, a new data flow is written into the second area, and the originally written data flow is read from the first area. In this way, data processing performance is improved by using a double buffering technology.

Optionally, a prefetch request is sent before the buffer may fail, so that a data flow is already written to the buffer in advance when the data flow is read, thereby avoiding a processor pause caused by a failure of the buffer. Efficient executable code is generated through prefetch optimization.

Figure 12:
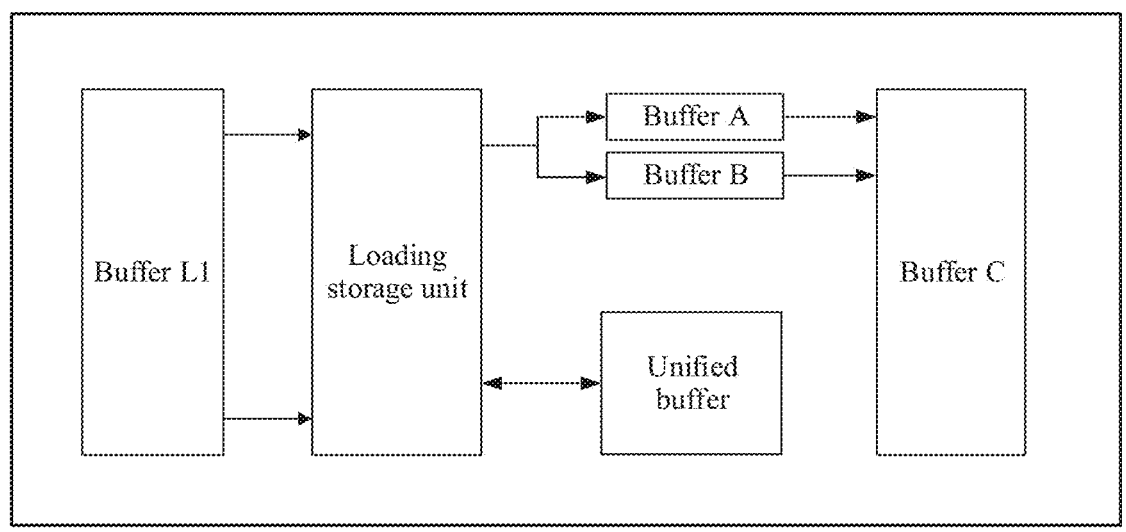
FIG. 12 is a schematic structural diagram of a chip according to an embodiment of this application.

For example, FIG. 12 is a schematic structural diagram of a chip according to an embodiment of this application. The chip includes six parallel operation pipelines: a scalar pipeline (PIPE S), a vector pipeline (PIPE_V), a matrix pipeline (PIPE_M), and three DMA pipelines (PIPE_MTE1, PIPE_MTE 2, and PIPE_MTE 3). All instructions first uniformly enter the scalar pipeline, and then the scalar pipeline distributes the instructions to other operation pipelines. As can be learned from FIG. 12, the chip internally includes a plurality of levels of memory space such as a buffer L1, a buffer A, a buffer B, a buffer C, and a uniform buffer. When there is a data dependency between operations of various operation pipelines in these levels of memory space, the synchronization logic needs to be used to ensure an execution sequence of the instructions.

It should be understood that the synchronization logic of the operation pipelines is provided inside the chip, and the synchronization logic includes a barrier instruction pipe_barrier (pipe) and event synchronization instructions set_flag(pipe, tripperp, eventId) and wait_flag(pipe, tripperp, eventId). The barrier instruction is used to ensure that all instructions before the barrier instruction are executed first before a subsequent instruction can start to be executed. The parameter pipe is used to specify an operation pipeline. When a single operation pipeline is blocked, all instructions in the operation pipeline before the barrier instruction are executed first before a subsequent instruction can start to be executed. When all operation pipelines are blocked, instructions in all the operation pipelines before the barrier instruction are executed first before a subsequent instruction can start to be executed. set_flag and wait_flag respectively indicate setting and waiting of a synchronization event, pipe indicates an operation pipeline of a setting event, tripperp indicates an operation pipeline of a waiting event, evenId indicates an event ID, and set_flag and wait_flag need to be used in pairs.

FIG. 13 shows programming code for explicitly invoking a synchronization instruction according to an embodiment of this application. The programming code is used to process an activation function (rectified linear unit, ReLu) operator. Implementation of the ReLu operator in a chip includes three operations: a first operation of loading data from a global memory to a first UB memory; a second operation of reading data from a UB to perform a vector operation and writing a vector operation result to a second UB memory; and a third operation of returning data in the first UB memory to the global memory. Because there is a dependency relationship between the three operations in the UB memory, set_flag and wait_flag need to be explicitly inserted to ensure an execution sequence of instructions. The synchronization logic has been marked in FIG. 13. The second operation is used as an example. The data in the UB needs to be read to perform the vector operation, and the vector operation result is written into another UB memory. Therefore, waiting is required before the second operation is performed.

Corresponding to the explicit invoking manner shown in FIG. 13, FIG. 14 shows programming code based on a data flow description according to an embodiment of this application. A user needs to define only a buffer and an operation pipeline and specifies a read buffer and a write buffer of the operation pipeline to describe a dependency relationship and an execution sequence of a data flow. For example, the buffer is defined by make_buffer ((half*) flowTable→ubInputAddr[0]), a first operation pipeline is defined by stage outToUb, a second operation pipeline is defined by Stage vector_rule, and a third operation pipeline is defined by Stage ubToOut. After the foregoing coding is completed, a compiler may perform analysis based on a data flow description specified by the user, determine the dependency relationship and the execution sequence to generate synchronization logic, and insert the synchronization logic into target code to generate executable code, to achieve a same effect as that of the programming code shown in FIG. 13. However, compared with a manner of explicitly invoking a synchronization instruction, in a synchronization manner based on a data flow description, the synchronization logic does not need to be inserted into programming code, and instead the compiler automatically inserts the synchronization logic after performing dependency analysis.

In this embodiment of this application, a user defines a buffer and an operation pipeline and specifies a read buffer and a write buffer of the operation pipeline to describe the data flow. A synchronization manner based on a data flow description hides hardware synchronization details, simplifies programming, and decouples a hardware architecture and software development to facilitate software and hardware upgrade. In addition, the compiler may determine the dependency relationship and the execution sequence between operations through serialization analysis, and automatically insert the synchronization logic. Further, the transfer dependency is eliminated, and insertion of an optimal synchronization instruction is ensured, thereby improving performance of the compiler and data processing efficiency.

The foregoing describes the method in the embodiments of this application in detail. The following provides an apparatus in the embodiments of this application.

FIG. 15 is a schematic structural diagram of a data flow processing apparatus according to an embodiment of this application. The data flow processing apparatus may include: an obtaining module 1501 and a processing module 1502. Detailed descriptions of the modules are as follows:

The obtaining module 1501 is configured to obtain a dependency relationship and an execution sequence of operating a data flow by a plurality of processing units.

The processing module 1502 is configured to generate synchronization logic based on the dependency relationship and the execution sequence.

The processing module 1502 is further configured to insert the synchronization logic into an operation pipeline of each of the plurality of processing units, to generate executable code.

The processing module 1502 is further configured to: obtain descriptive code used to describe the data flow; and determine the dependency relationship and the execution sequence based on the descriptive code.

The descriptive code includes at least one of a keyword used to define a buffer variable, a keyword used to describe a read operation and a write operation for buffering the data flow, an operator used to specify a write buffer variable, and a keyword used to specify a read buffer variable.

The dependency relationship indicates that a first operation instruction in an operation pipeline of a first processing unit of the plurality of processing units is executed first before a second operation instruction in an operation pipeline of a second processing unit of the plurality of processing units starts to be executed. The execution sequence indicates a time sequence in which operation instructions of the plurality of processing units that are transmitted to a corresponding type of operation pipeline wait for execution.

The processing module 1502 is further configured to: construct, based on the dependency relationship and the execution sequence, a dependency decision tree of operating the data flow by the plurality of processing units, and generate the synchronization logic based on the dependency decision tree.

The processing module 1502 is further configured to: generate an event synchronization instruction based on the dependency relationship; and generate a barrier instruction based on the execution sequence.

The processing module 1502 is further configured to: determine whether the dependency relationship is transfer dependency; and when the dependency relationship is not transfer dependency, generate the synchronization logic.

It should be noted that, for implementation of each module, correspondingly refer to corresponding descriptions in the method embodiment shown in FIG. 7, and the method and the functions performed by the compiler in the foregoing embodiments are performed.

Figure 16:
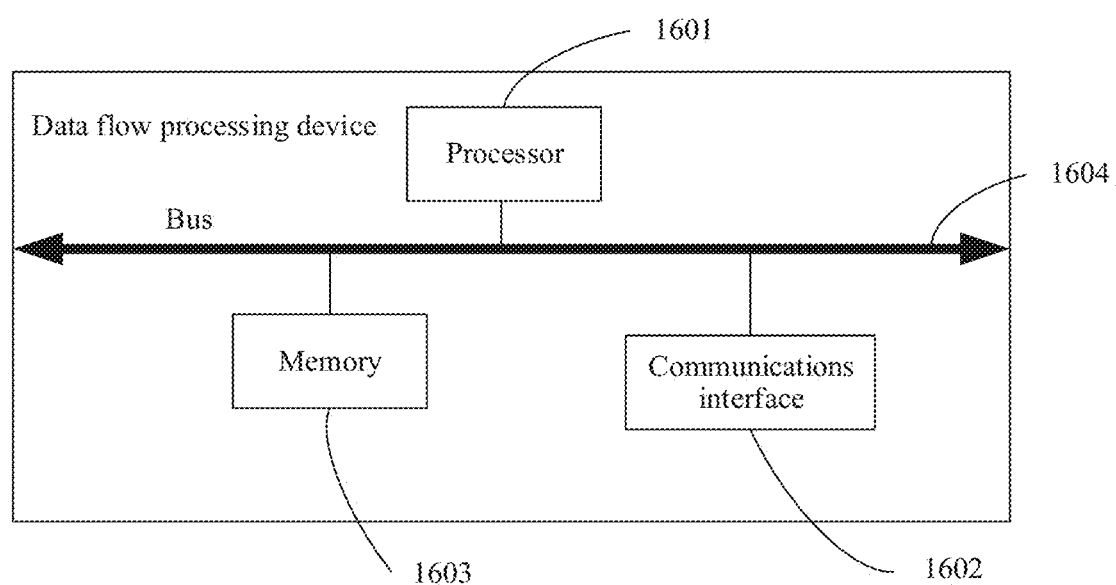
FIG. 16 is a schematic structural diagram of a data flow processing device according to this application.

FIG. 16 is a schematic structural diagram of a data flow processing device according to this application. As shown in FIG. 16, the data flow processing device may include: at least one processor 1601, at least one communications interface 1602, at least one memory 1603, and at least one communications bus 1604.

The processor 1601 may be a central processing unit, a general-purpose processor, a digital signal processor, an application-specific integrated circuit, a field programmable gate array or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The communications bus 1604 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 16, but this does not mean that there is only one bus or only one type of bus. The communications bus 1604 is configured to implement connection and communication between these components. The communications interface 1602 of the device in this embodiment of this application is configured to perform signaling or data communication with another node device. The memory 1603 may include a volatile memory, for example, a nonvolatile dynamic random access memory (NVRAM), a phase change random access memory (PRAM), or a magnetoresistive random access memory (MRM), and may further include a non-volatile memory, for example, at least one magnetic disk storage device, an electrically erasable programmable read-only memory (EEPROM), a flash memory device such as a NOR flash memory or a NAND flash memory, or a semiconductor device such as a solid state disk (SSD). Optionally, the memory 1603 may alternatively be at least one storage apparatus far away from the processor 1601. Optionally, the memory 1603 may further store a set of program code. Optionally, the processor 1601 may further execute a program stored in the memory 1603.

obtaining a dependency relationship and an execution sequence of operating a data flow by a plurality of processing units;

generating synchronization logic based on the dependency relationship and the execution sequence; and inserting the synchronization logic into an operation pipeline of each of the plurality of processing units, to generate executable code.

Optionally, the processor 1601 is further configured to perform the following operations:
  obtaining descriptive code used to describe the data flow; and
  determining the dependency relationship and the execution sequence based on the descriptive code.

The descriptive code includes at least one of a keyword used to define a buffer variable, a keyword used to describe a read operation and a write operation for buffering the data flow, an operator used to specify a write buffer variable, and a keyword used to specify a read buffer variable.

The dependency relationship indicates that a first operation instruction in an operation pipeline of a first processing unit of the plurality of processing units is executed first before a second operation instruction in an operation pipeline of a second processing unit of the plurality of processing units starts to be executed. The execution sequence indicates a time sequence in which operation instructions of the plurality of processing units that are transmitted to a corresponding type of operation pipeline wait for execution.

Optionally, the processor 1601 is further configured to perform the following operations:
  constructing, based on the dependency relationship and the execution sequence, a dependency decision tree for operating the data flow by the plurality of processing units; and
  generating the synchronization logic based on the dependency decision tree.

Optionally, the processor 1601 is further configured to perform the following operations:
  generating an event synchronization instruction based on the dependency relationship; and
  generating a barrier instruction based on the execution sequence.

Optionally, the processor 1601 is further configured to perform the following operations:
  determining whether the dependency relationship is transfer dependency; and
  generating the synchronization logic when the dependency relationship is not transfer dependency.

Further, the processor may further cooperate with the memory and the communications interface to perform operations of the data flow processing apparatus in the foregoing embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The objectives, technical solutions, and beneficial effects of this application are further described in detail in the foregoing specific implementations. Any modification, equivalent replacement, or improvement made without departing from the spirit and principle of this application shall fall within the protection scope of this application,

What is claimed is:

1. A data flow processing method, wherein the method comprises:
  obtaining, through serialization analysis, a dependency relationship and an execution sequence of operating a data flow by a plurality of processing units, wherein each processing unit of the plurality of processing units corresponds to an operation pipeline;
  generating synchronization logic based on the dependency relationship and the execution sequence, wherein the synchronization logic ensures synchronization between operation instructions in the plurality of operation pipelines; and
  in response to generating the synchronization logic, automatically inserting the synchronization logic into each operation pipeline corresponding to each processing unit of the plurality of processing units to generate executable code.

2. The method according to claim 1, wherein obtaining the dependency relationship and the execution sequence of operating the data flow by the plurality of processing units comprises:
  obtaining descriptive code used to describe the data flow; and
  determining the dependency relationship and the execution sequence based on the descriptive code.

3. The method according to claim 2, wherein the descriptive code comprises at least one of a keyword used to define a buffer variable, a keyword used to describe a read operation and a write operation for buffering the data flow, an operator used to specify a write buffer variable, or a keyword used to specify a read buffer variable.

4. The method according to claim 1, wherein the dependency relationship indicates that a first operation instruction in an operation pipeline of a first processing unit of the plurality of processing units is executed first before a second operation instruction in an operation pipeline of a second processing unit of the plurality of processing units starts to be executed, and wherein the execution sequence indicates a time sequence in which operation instructions of the plurality of processing units that are transmitted to operation pipelines of a corresponding type to wait for execution.

5. The method according to claim 1, wherein generating the synchronization logic based on the dependency relationship and the execution sequence comprises:
  constructing, based on the dependency relationship and the execution sequence, a dependency decision tree of operating the data flow by the plurality of processing units; and
  generating the synchronization logic based on the dependency decision tree.

6. The method according to claim 1, wherein the synchronization logic comprises a barrier instruction and an event synchronization instruction, and wherein generating the synchronization logic based on the dependency relationship and the execution sequence comprises:

generating the event synchronization instruction based on the dependency relationship; and generating the barrier instruction based on the execution sequence.

7. The method according to claim 1, wherein generating the synchronization logic based on the dependency relationship and the execution sequence comprises:

determining that the dependency relationship is not transfer dependency; and generating the synchronization logic in response to determining that the dependency relationship is not the transfer dependency.

8. A data flow processing apparatus, comprising a memory, a communications bus, and at least one processor, wherein the memory stores programming instructions for execution by the at least one processor to perform operations comprising:

obtaining, through serialization analysis, a dependency relationship and an execution sequence of operating a data flow by a plurality of processing units, wherein each processing unit of the plurality of processing units corresponds to an operation pipeline;

generating synchronization logic based on the dependency relationship and the execution sequence, wherein the synchronization logic ensures synchronization between operation instructions in the plurality of operation pipelines; and in response to generating the synchronization logic, automatically inserting the synchronization logic into each operation pipeline corresponding to each processing unit of the plurality of processing units to generate executable code.

9. The apparatus according to claim 8, wherein obtaining the dependency relationship and the execution sequence of operating the data flow by the plurality of processing units comprises:

obtaining descriptive code used to describe the data flow; and determining the dependency relationship and the execution sequence based on the descriptive code.

10. The apparatus according to claim 9, wherein the descriptive code comprises at least one of a keyword used to define a buffer variable, a keyword used to describe a read operation and a write operation for buffering the data flow, an operator used to specify a write buffer variable, or a keyword used to specify a read buffer variable.

11. The apparatus according to claim 8, wherein the dependency relationship indicates that a first operation instruction in an operation pipeline of a first processing unit of the plurality of processing units is executed first before a second operation instruction in an operation pipeline of a second processing unit of the plurality of processing units starts to be executed, and wherein the execution sequence indicates a time sequence in which operation instructions of the plurality of processing units that are transmitted to operation pipelines of a corresponding type to wait for execution.

12. The apparatus according to claim 8, wherein generating the synchronization logic based on the dependency relationship and the execution sequence comprises:

constructing, based on the dependency relationship and the execution sequence, a dependency decision tree of operating the data flow by the plurality of processing units; and generating the synchronization logic based on the dependency decision tree.

13. The apparatus according to claim 8, wherein the synchronization logic comprises a barrier instruction and an event synchronization instruction, and wherein generating the synchronization logic based on the dependency relationship and the execution sequence comprises:

generating the event synchronization instruction based on the dependency relationship; and generating the barrier instruction based on the execution sequence.

14. The apparatus according to claim 8, wherein generating the synchronization logic based on the dependency relationship and the execution sequence comprises:

determining that the dependency relationship is not transfer dependency; and generating the synchronization logic in response to determining that the dependency relationship is not the transfer dependency.

15. A non-transitory computer-readable storage medium, wherein the computer-readable storage medium stores an instruction which when run on a computer, cause the computer to perform operations comprising:

obtaining, through serialization analysis, a dependency relationship and an execution sequence of operating a data flow by a plurality of processing units, wherein each processing unit of the plurality of processing units corresponds to an operation pipeline;

generating synchronization logic based on the dependency relationship and the execution sequence, wherein the synchronization logic ensures synchronization between operation instructions in the plurality of operation pipelines; and in response to generating the synchronization logic, automatically inserting the synchronization logic into each operation pipeline corresponding to each processing unit of the plurality of processing units to generate executable code.

16. The non-transitory computer-readable storage medium according to claim 15, wherein obtaining the dependency relationship and the execution sequence of operating the data flow by the plurality of processing units comprises:

obtaining descriptive code used to describe the data flow; and determining the dependency relationship and the execution sequence based on the descriptive code.

17. The non-transitory computer-readable storage medium according to claim 16, wherein the descriptive code comprises at least one of a keyword used to define a buffer variable, a keyword used to describe a read operation and a write operation for buffering the data flow, an operator used to specify a write buffer variable, or a keyword used to specify a read buffer variable.

18. The non-transitory computer-readable storage medium according to claim 15, wherein the dependency relationship indicates that a first operation instruction in an operation pipeline of a first processing unit of the plurality of processing units is executed first before a second operation instruction in an operation pipeline of a second processing unit of the plurality of processing units starts to be executed, and wherein the execution sequence indicates a time sequence in which operation instructions of the plurality of processing units that are transmitted to operation pipelines of a corresponding type to wait for execution.

19. The non-transitory computer-readable storage medium according to claim 15, wherein generating the synchronization logic based on the dependency relationship and the execution sequence comprises:

constructing, based on the dependency relationship and the execution sequence, a dependency decision tree of operating the data flow by the plurality of processing units; and generating the synchronization logic based on the dependency decision tree.

\* \* \* \* \*